United States Patent [19]
Li

[11] Patent Number: 6,055,328
[45] Date of Patent: Apr. 25, 2000

[54] ANALYZING AN ACQUIRED ARRANGEMENT OF OBJECT LOCATIONS

[75] Inventor: David Li, West Roxbury, Mass.

[73] Assignee: Cognex Corporation, Natick, Mass.

[21] Appl. No.: 09/008,219

[22] Filed: Jan. 16, 1998

[51] Int. Cl.[7] .................................................. G06K 9/00
[52] U.S. Cl. ........................ 382/145; 382/286; 382/197
[58] Field of Search .................... 382/141, 147, 382/145, 149, 150, 197, 311, 286; 356/237; 348/125, 126, 86; 364/468.01, 468.02, 468.28

[56] References Cited

U.S. PATENT DOCUMENTS

| 5,465,152 | 11/1995 | Bilodeau et al. | 356/371 |
|---|---|---|---|
| 5,550,763 | 8/1996 | Michael et al. | 364/582 |
| 5,574,668 | 11/1996 | Beaty | 364/558 |
| 5,574,801 | 11/1996 | Collet-Beillon | 382/150 |
| 5,592,562 | 1/1997 | Rooks | 382/150 |
| 5,652,658 | 7/1997 | Jackson et al. | 356/398 |
| 5,828,449 | 10/1998 | King et al. | 356/237 |

FOREIGN PATENT DOCUMENTS

WO 95/11519  4/1995  WIPO .

OTHER PUBLICATIONS

Deley et al., "Accurate Placement of Ball Grid Array Packages," reprinted from *Electronic Packaging & Production*, Apr. 1996, Cahners Publishing Company, Newton, MA, USA.

University of Waterloo Computer Graphics Lab, "Affine Transformations," http://www.undergrad.math.uwaterloo.ca/~cs488/In.HTML/Affinenode4.html, pp. 1–3.

Thomas, Jr., George B., "Chapter 14 Partial Differentiation," *Calculus and Analytic Geometry*, 1953, pp. 481–532, Addison–Wesley Publishing Company, Inc., Cambridge, MA, USA.

Cognex Corporation, Chapter 7 Mathematics, Coordinate Transformation by Pseudoinverse, *Cognex 3000/4000/5000 System Software*, 1996, pp. 204–210, Revision 7.4 590–0134, Natick, MA.

Cognex Corporation, "Chapter 1 Searching, Correlation Searching," *Cognex 3000/4000/5000 Vision Tools*, 1996, pp. 17–25, Revision 7.4 590–0136, Natick, MA.

Ballard, D.H., "Generalizing the Hough Transform to Detect Arbitrary Shapes*," *Pattern Recognition*, 1981, pp. 111–122, vol. 13, No. 2, Pergamon Press Ltd., UK.

ICOS Vision Systems, Inc., "ICOS 2–Dimensional BGA Inspection System," specification sheet, pp. 1–6, Waltham, MA, USA.

ICOS Vision Systems, Inc., "ICOS Component Checker for BGA Inspection," specification sheet, Waltham, MA, USA.

Caracappa, Ed., "On Improving BGA Reliability and Quality," *Surface Mount Technology Magazine*, Jun. 1997, pp. 44–46, Libertyville, IL, USA.

R.A. Hoogenboom, "Normalized Correlation Coefficient," http:www.wi.leidenuniv.nl./~rhoogenb/node26.html, pp. 1–2.

Silver et al., "Practical Golden Template Comparison," *Cognex Corporation*, Jun. 6, 1990, pp. 2–11, Needham, MA, USA.

"RVSI Vanguard Products," http://www.vai.net/products/products.htm, pp. 1–2.

"RVSI Vanguard VAi 5020," http://www.vai.net.products.prod01.htm, pp. 1–4.

"RVSI Vanguard VAi 5200/VAi 5300," http://www.vai.net/products/prod02.htm, pp. 1–4.

"RVSI Vanguard VAi 6300," http://www.vai.net/products/6300.htm, pp. 1–5.

Grimson et al., "On the Sensitivity of the Hough Transform for Object Recognition," *IEEE Transactions on Pattern Analysis and Machine Intelligence*, Mar. 1990, pp. 255–274, vol. 12. No. 3.

Primary Examiner—Amelia Au
Assistant Examiner—Vikkram Bali
Attorney, Agent, or Firm—Pillsbury, Madison & Sutro

[57] ABSTRACT

An acquired arrangement of object locations is analyzed. The acquired arrangement imperfectly conforms to an ideal arrangement of points. Sets of vectors are found in the acquired arrangement. A composite set of vectors is derived from the sets of vectors.

13 Claims, 25 Drawing Sheets

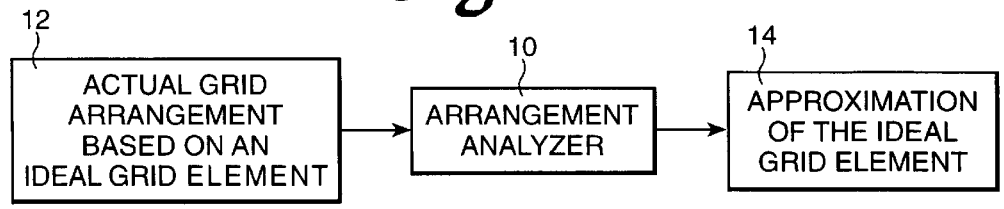
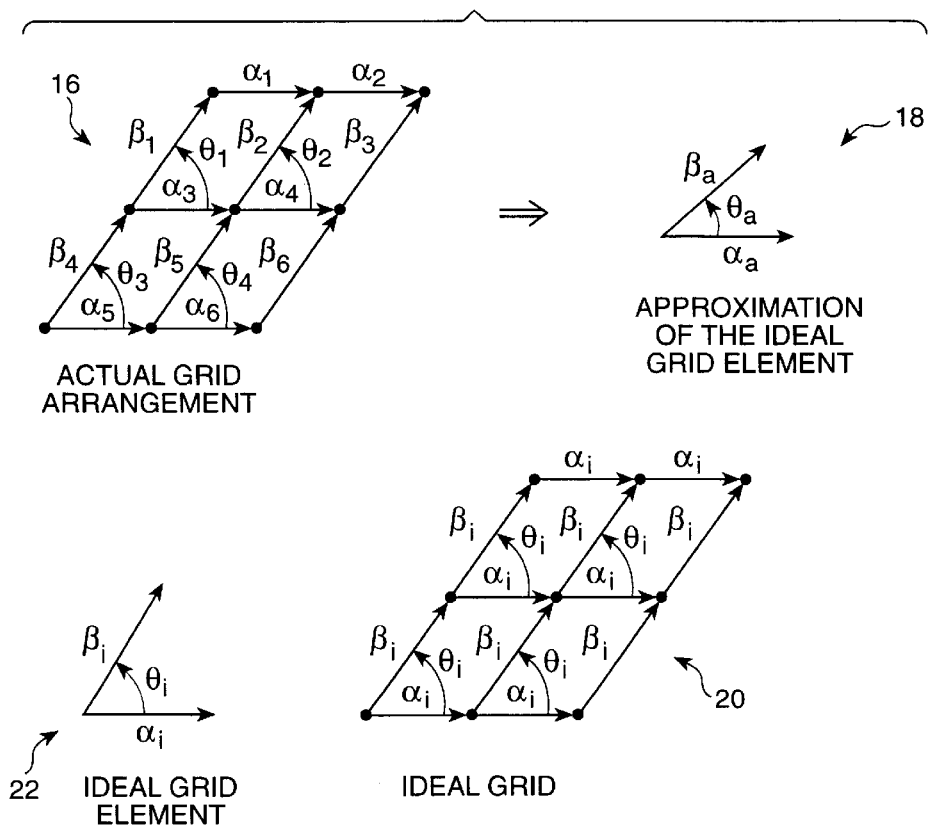

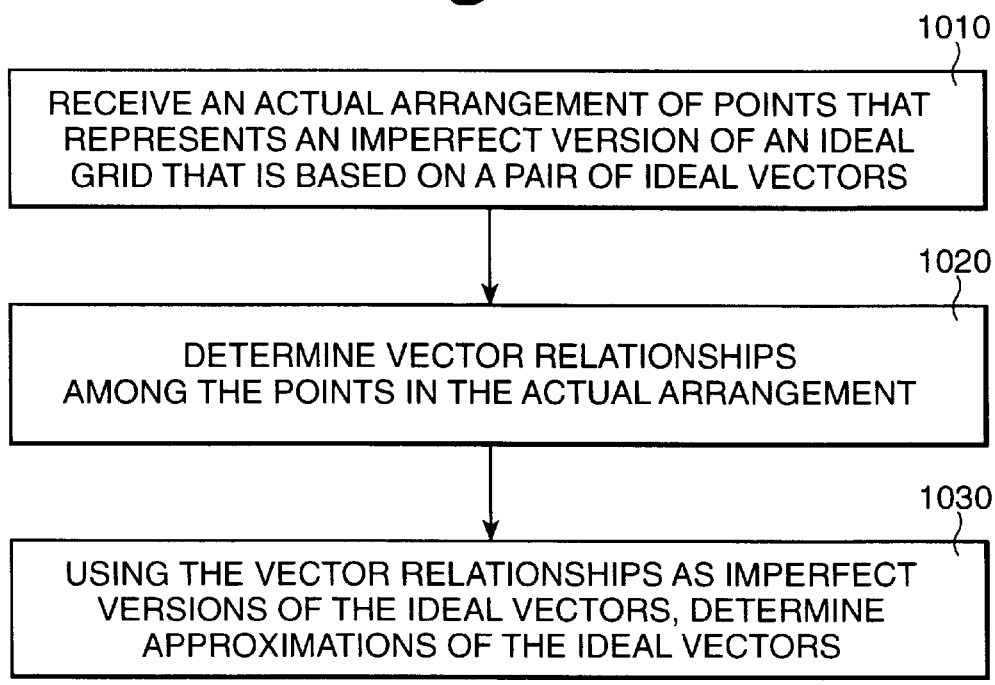

Fig. 14

| POINT | X-COORD | Y-COORD | VECTORS TO NEAREST POINTS | | | | |
|---|---|---|---|---|---|---|---|
| A | 94 | 70 | AB | AJ | AK | AM | |
| B | 86 | 100 | BA | BC | BD | BJ | |
| C | 78 | 128 | CB | CD | CE | CM | |
| D | 106 | 134 | DC | DE | DB | DM | |
| E | 136 | 139 | ED | EF | EM | EN | |
| F | 165 | 144 | FN | FE | FG | FH | |
| G | 195 | 150 | GF | GN | GH | GE | |
| H | 203 | 120 | HN | HG | HI | HF | |
| I | 210 | 90 | IH | IL | IN | IK | |
| J | 138 | 98 | JK | JM | JL | JB | |
| K | 150 | 90 | KJ | KL | KM | KA | |
| L | 157 | 102 | LM | LK | LJ | LN | |
| M | 145 | 110 | MJ | ML | MK | MN | |
| N | 177 | 126 | NH | NF | NG | NL | |

Fig. 16

| VECTOR | LENGTH | ANGLE | VECTOR | LENGTH | ANGLE |
|---|---|---|---|---|---|
| AB | 31 | 104 | HN | 28 | 164 |
| AJ | 52 | 33 | HG | 31 | 105 |
| AK | 60 | 20 | HI | 31 | 285 |
| AM | 65 | 38 | HF | 45 | 148 |
| BA | 31 | 284 | IH | 31 | 105 |
| BC | 29 | 106 | IL | 54 | 169 |
| BD | 39 | 61 | IN | 48 | 132 |
| BJ | 52 | 358 | IK | 60 | 180 |
| CB | 29 | 286 | JK | 14 | 329 |
| CD | 29 | 12 | JM | 14 | 59 |
| CE | 59 | 11 | JL | 19 | 12 |
| CM | 69 | 345 | JB | 52 | 178 |
| DC | 29 | 192 | KJ | 14 | 149 |
| DE | 30 | 10 | KL | 14 | 59 |
| DB | 39 | 241 | KM | 21 | 104 |
| DM | 46 | 329 | KA | 60 | 200 |
| ED | 30 | 190 | LM | 14 | 149 |
| EF | 29 | 10 | LK | 14 | 239 |
| EM | 30 | 285 | LJ | 19 | 192 |
| EN | 43 | 342 | LN | 31 | 51 |
| FN | 22 | 305 | MJ | 14 | 239 |
| FE | 29 | 190 | ML | 14 | 329 |
| FG | 31 | 11 | MK | 21 | 284 |
| FH | 45 | 328 | MN | 36 | 26 |
| GF | 31 | 191 | NH | 27 | 344 |
| GN | 30 | 233 | NF | 22 | 125 |
| GH | 31 | 285 | NG | 30 | 53 |
| GE | 60 | 191 | NL | 31 | 231 |

Fig. 22

| ALPHA, BETA LOCATION | ON/OFF |
|---|---|
| 0.0 | ON |
| 0.1 | ON |
| 0.2 | ON |
| 0.3 | OFF |
| 1.0 | OFF |
| 1.1 | OFF |
| 1.2 | ON |
| 1.3 | OFF |
| 2.0 | OFF |
| 2.1 | ON |
| 2.2 | ON |
| 2.3 | OFF |
| 3.0 | OFF |
| 3.1 | OFF |
| 3.2 | ON |
| 3.3 | OFF |
| 4.0 | ON |
| 4.1 | ON |
| 4.2 | ON |
| 4.3 | OFF |
| 5.0 | OFF |
| 5.1 | OFF |
| 5.2 | OFF |
| 5.3 | OFF |

| ALPHA, BETA LOCATION | ON/OFF |
|---|---|
| 0.0 | OFF |
| 0.1 | ON |
| 0.2 | OFF |
| 0.3 | OFF |
| 1.0 | OFF |
| 1.1 | ON |
| 1.2 | ON |
| 1.3 | OFF |
| 2.0 | OFF |
| 2.1 | OFF |
| 2.2 | OFF |
| 2.3 | OFF |

86

ANALYZING AN ACQUIRED ARRANGEMENT OF OBJECT LOCATIONS

BACKGROUND OF THE INVENTION

The invention relates to analyzing an acquired arrangement of object locations.

The usefulness of a product expected to include items or attributes in a predetermined arrangement is diminished by a defect relating to the arrangement. If the product is meant to be a component in another product, this defect may ruin the other product.

For this reason, products incorporating such items or attributes in such predetermined arrangements may be inspected for compliance with some standard. Examples of products appropriate for inspection include ball grid array devices, micro-ball grid arrays, flip chips, and chip-scale packages (together called "BGAs"). The contacts (i.e., electrical terminals) of a BGA are metallic balls that are mounted on one side of the device for forming electrical connections between an integrated circuit within the BGA and a printed circuit board.

The standard used in the inspection is typically created by manual entry of coordinates, by "golden template" sampling, by derivation from computer-aided design ("CAD") data, or by some combination of these. According to the manual entry technique, a human operator uses a data entry device, such as a mouse or a keyboard, to specify x-y coordinates for the position of each object in the arrangement. Thus, manual entry can require considerable time. In golden template sampling, the positions of the objects in the standard are taken to be the positions found in an actual implementation of an ideal arrangement (e.g., an arrangement of balls of an actual BGA device). Golden template sampling may take less time than manual entry but may provide results that are less accurate. With respect to derivation from CAD data, the positions of the objects may be determined by software that automatically selects the positions in accordance with information about design goals, if such information is available.

SUMMARY OF THE INVENTION

In general, in one aspect, the invention features a method for analyzing an acquired arrangement of object locations that imperfectly conforms to an ideal arrangement of points. The method includes finding sets of vectors in the acquired arrangement of object locations, and deriving a composite set of vectors from the sets of vectors.

Implementations of the invention may include one or more of the following features. At least one of the object locations may represent an electrical terminal. The method may further include deriving an approximation of the ideal arrangement of points from the acquired arrangement of object locations, wherein the approximation includes an indication of whether an intersection specified by the composite set of vectors corresponds to an object location. The method may further include determining vectors between an object location and a number of the object location's nearest neighboring points, or determining whether an object location matches, to an acceptable tolerance, a position specified by the composite set of vectors. The method may further include adjusting at least one of the vectors in the composite set to take into account a difference between the position specified and the actual position of the matching object location. The method may further include, based on the composite set of vectors and the actual position of the matching object location, specifying a location in which to search for another matching object location. The method may further include determining whether a non-matching object location matches, to an acceptable tolerance, another position specified by another composite set of the vectors.

In general, in another aspect, the invention features a system for detecting a pattern of discrete objects represented in an image. The system includes a location producer deriving an arrangement of object locations from the image, each object location representing an electrical terminal; a vectors producer deriving a set of vectors represented in the arrangement; a grid element producer deriving a two-vector grid element from the set of vectors; and a grid producer and grid element refiner testing the two-vector grid element against the arrangement of object locations and refining the two-vector grid element to take into account the actual positions of the object locations.

Among the advantages of the invention are one or more of the following. An effective approximation of an ideal regular pattern can be derived from a single golden template sample. Thus, in a case where direct information about the ideal pattern is unavailable (e.g., because CAD data is non-existent or inaccessible), the sample can be used as indirect information about the ideal pattern. In addition, the effective approximation can provide a standard that is sufficient for use in a quality control inspection system, which renders unnecessary the expense of time and resources involved in creating the standard by direct information. At least a portion of the standard can be stored in abbreviated form (e.g., a grid element to be repeated, and an on-off table), which can significantly reduce data storage requirements, especially in cases of large arrangements.

Other advantages and features will become apparent from the following description and from the claims.

BRIEF DESCRIPTION OF THE DRAWINGS

FIG. 1 is a block diagram showing an arrangement analyzer.

FIG. 2 is an illustration of an approximation produced by the arrangement analyzer.

FIGS. 3 and 6 are flow diagrams of procedures.

FIG. 14 is a diagram helpful for understanding the diagram of FIG. 13.

FIG. 16 is a diagram helpful for understanding the diagram of FIG. 15.

FIGS. 22, 26 are on-off tables derived from the arrangement of FIG. 13.

DESCRIPTION OF THE PREFERRED EMBODIMENTS

Figure 4:
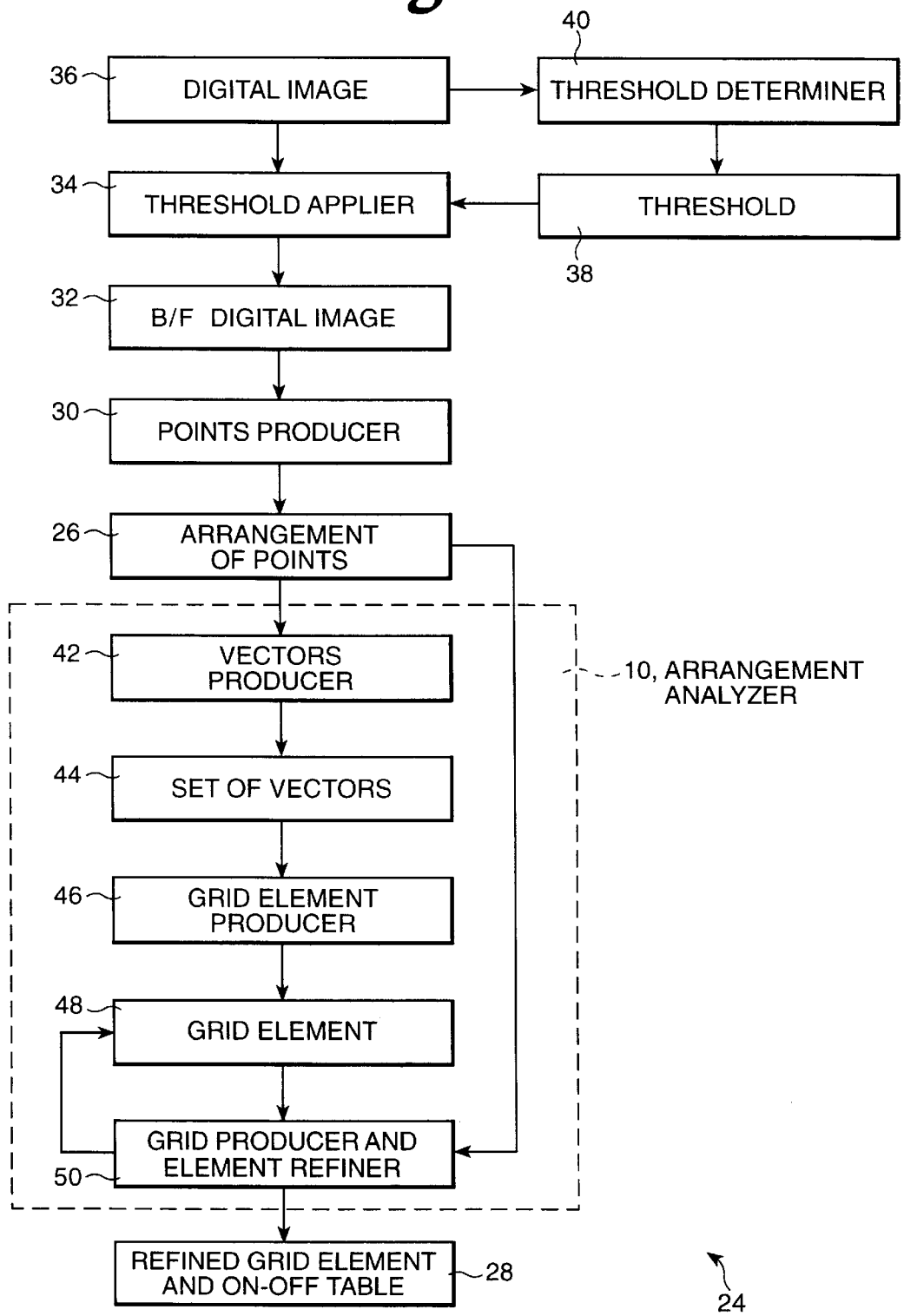
FIG. 4 is a block diagram of an image processing system.

FIG. 1 shows arrangement analyzer 10 that derives an approximation 14 of an ideal grid element (e.g., two ideal vectors disposed at an angle) from an actual, imperfect grid arrangement 12, such as an arrangement of electrical terminals, e.g., solder balls on a ball grid array device. As described below, the approximation 14 is derived by exploiting the fact that the actual arrangement 12 includes multiple imperfect implementations of the ideal grid element, which implementations can be averaged or otherwise combined to create the approximation 14.

With reference also to FIGS. 2–3, the arrangement analyzer 10 operates as follows where the ideal grid element is an ideal two-vector grid element (e.g., element 22) defined by two ideal vectors $\alpha_i$ and $\beta_i$ disposed at an ideal angle $\theta_i$. The analyzer 10 receives the actual arrangement 12 of points (e.g., arrangement 16) representing an imperfect version of an ideal grid (e.g., grid 20) that is based on the ideal two-vector grid element (step 1010). Vector relationships (e.g., vectors $\alpha_{1-6}$ and $\beta_{1-6}$ disposed at angles including angles $\theta_{1-4}$) are determined among the points in the actual arrangement 12 (step 1020). Using the vector relationships as imperfect versions of the ideal vectors disposed at the ideal angle, approximation vectors $\alpha_a$ and $\beta_a$ and approximation angle $\theta_a$ of the approximation grid element 14 (e.g., element 18) are determined (step 1030).

FIG. 4 illustrates image processing system 24 that is described in more detail below in connection with a procedure 64. The image processing system 24 uses the arrangement analyzer 10 to detect regular patterns represented in the digital image. The arrangement analyzer 10 receives an arrangement of points 26 (including actual arrangement 12) and produces an approximation set 28 that includes the approximation grid element 14 (as refined by the analyzer 10) and an on-off table.

In the image processing system 24, the arrangement of points 26 used by the arrangement analyzer 10 is produced as follows. In accordance with a threshold 38 derived from a digital image 36 by a threshold determiner 40, a threshold applier 34 derives from the digital image 36 a background/foreground digital image 32 that exposes an arrangement of similarly-sized discrete objects. From the background/foreground digital image 32, a points producer 30 derives the arrangement of points 26 which corresponds to the arrangement of discrete objects.

In the arrangement analyzer 10, from the arrangement of points 26 a vectors producer 42 derives a set of vectors 44 represented in the arrangement, from which set a grid element producer 46 creates a grid element 48 that is tested against the arrangement of points 26 by a grid producer and element refiner 50.

Figure 5:
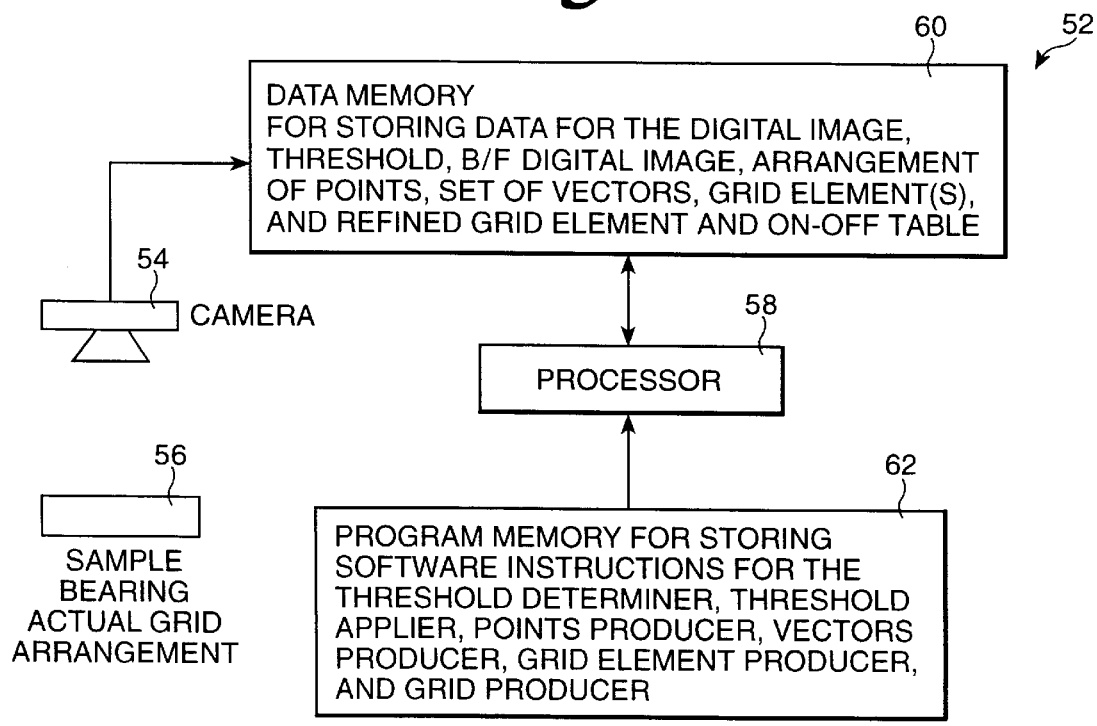
FIG. 5 is a block diagram of an implementation of the image processing system.

FIG. 5 shows implementation 52 of the image processing system 24, which implementation 52 includes a camera 54 for acquiring the digital image of a sample 56 (e.g., a ball grid array device) bearing the actual grid arrangement, a processor 58, a data memory 60, and a program memory 62. Software instructions are stored in the program memory 62 to cause the processor 58 to serve as the threshold determiner 40, threshold applier 34, points producer 30, vectors producer 42, grid element producer 46, and grid producer and element refiner 50.

Figure 6:
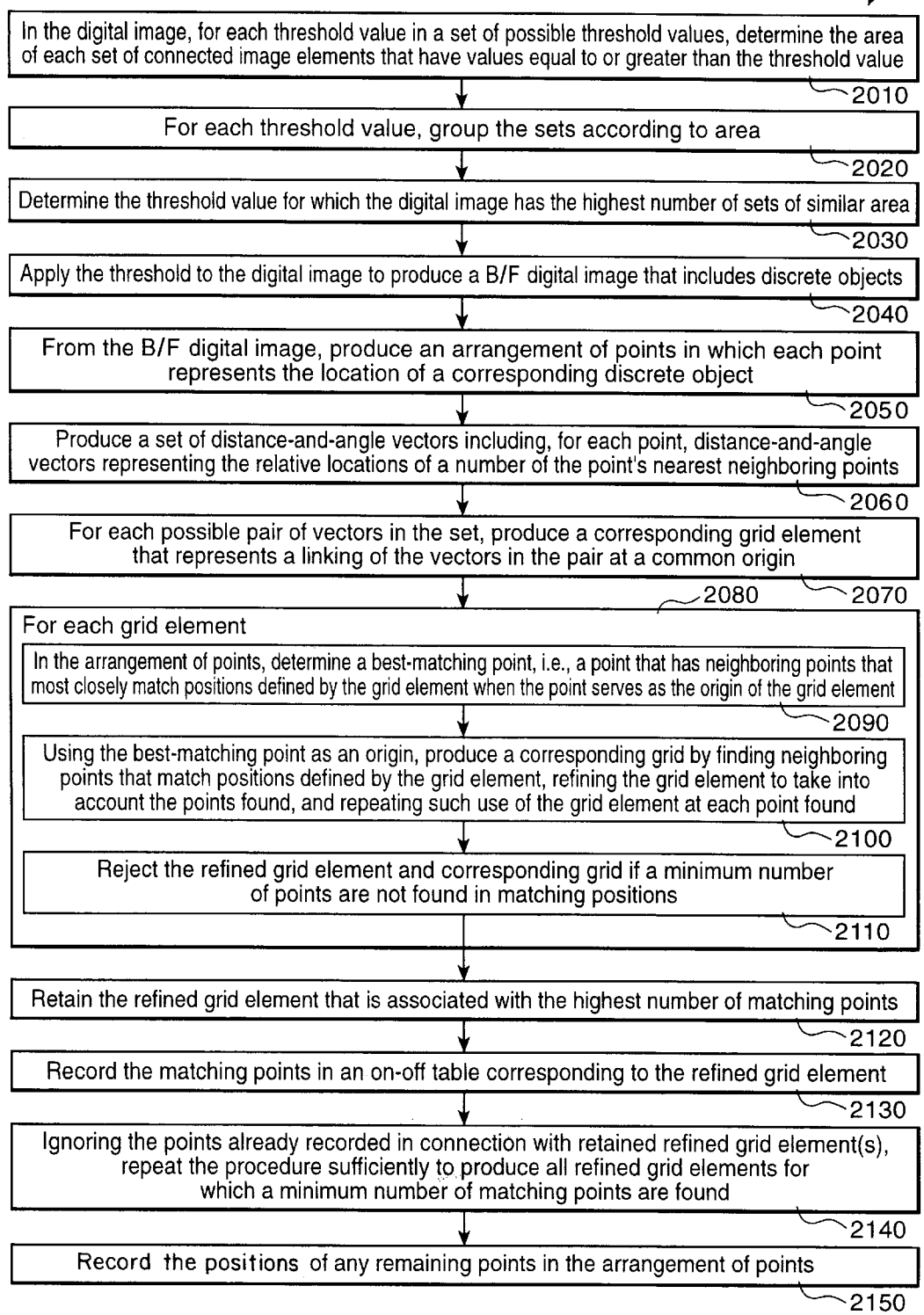
Figure 7:
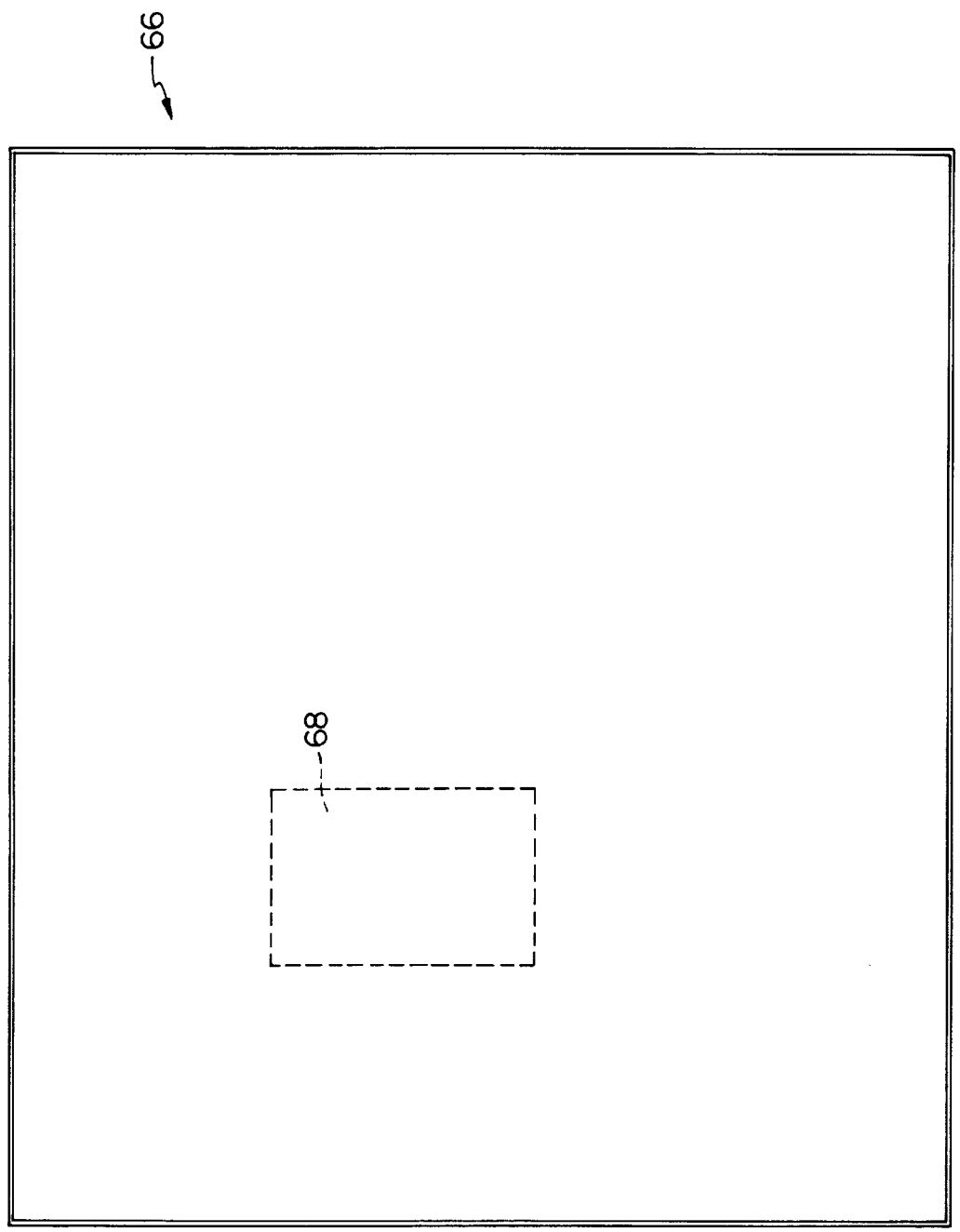
FIGS. 7–10 are illustrations of digital image data.
Figure 8:
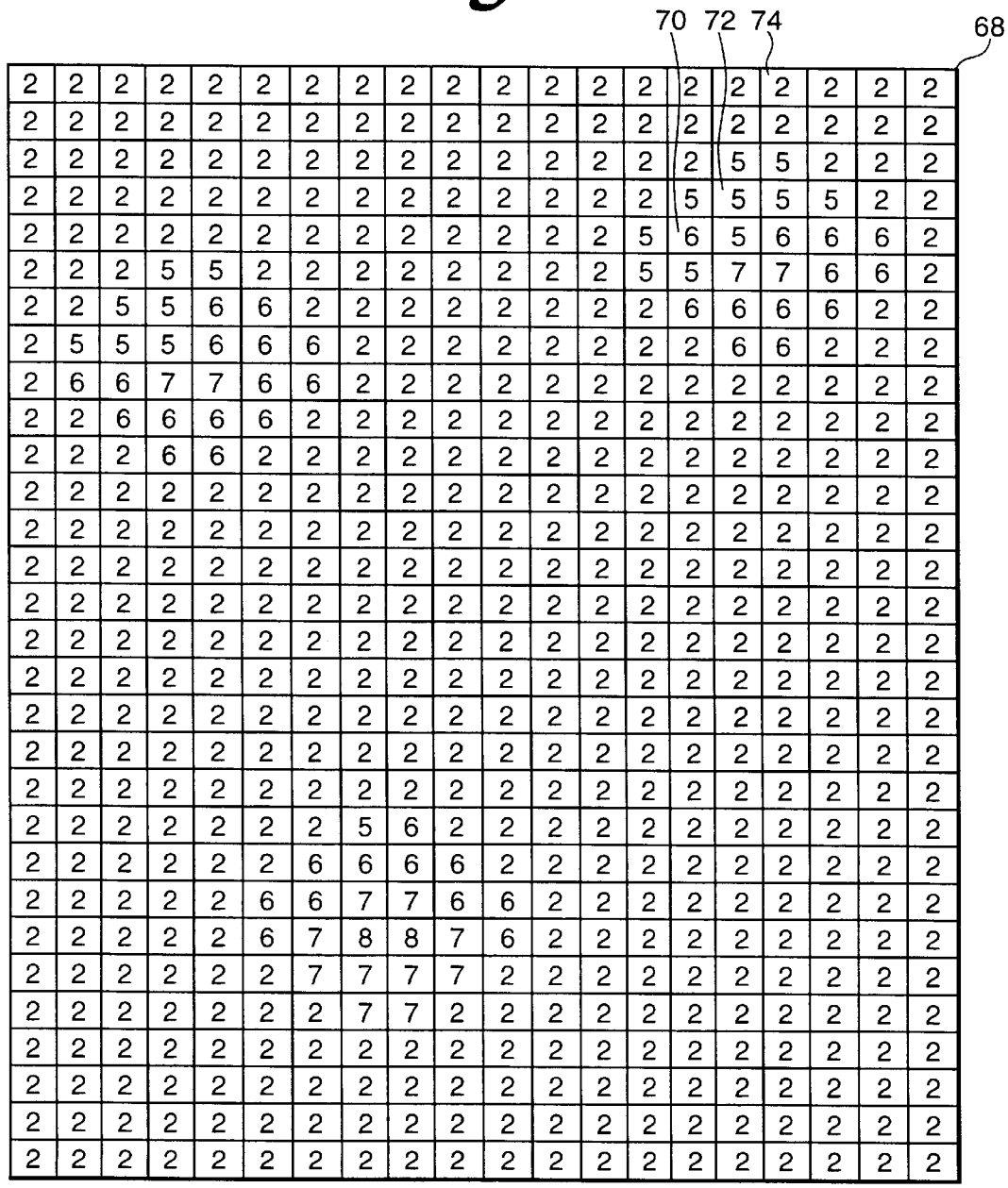

FIG. 6 shows procedure 64 (described below with reference to an example illustrated by FIGS. 7–26) executed by the processor 58 in accordance with the software instructions, to produce the refined grid element and on-off table 28 from the digital image 36, as shown in FIG. 4.

The digital image 36 (e.g., image 66 of FIG. 7 including a portion 68 shown in FIG. 8) includes image elements having respective values (e.g., elements 70, 72, 74 having respective values 6, 5, 2) each of which represents a characteristic such as a brightness level or a color. It is expected that the digital image 36 includes discrete objects (e.g., BGA balls) of similar size. As now described, to expose these discrete objects in the digital image 36, the threshold determiner 40 chooses a value for threshold 38 that emphasizes similar-sized sets of connected image elements, and the threshold applier 34 applies the threshold 38 to the digital image 36 to produce the background/foreground digital image 32 in which the similar-sized sets of image elements are in the foreground and the other image elements are in the background.

Figure 9:
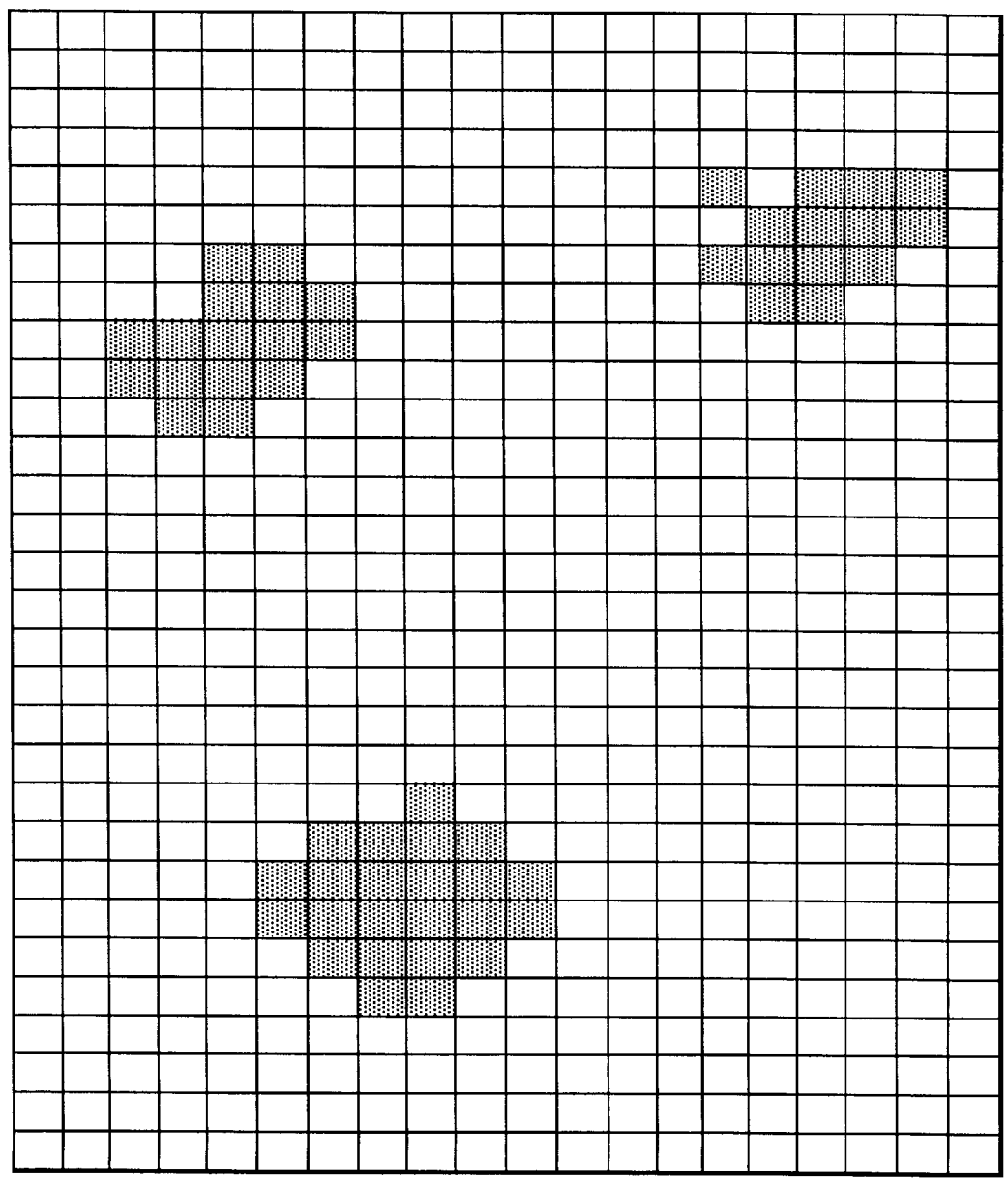
Figure 10:
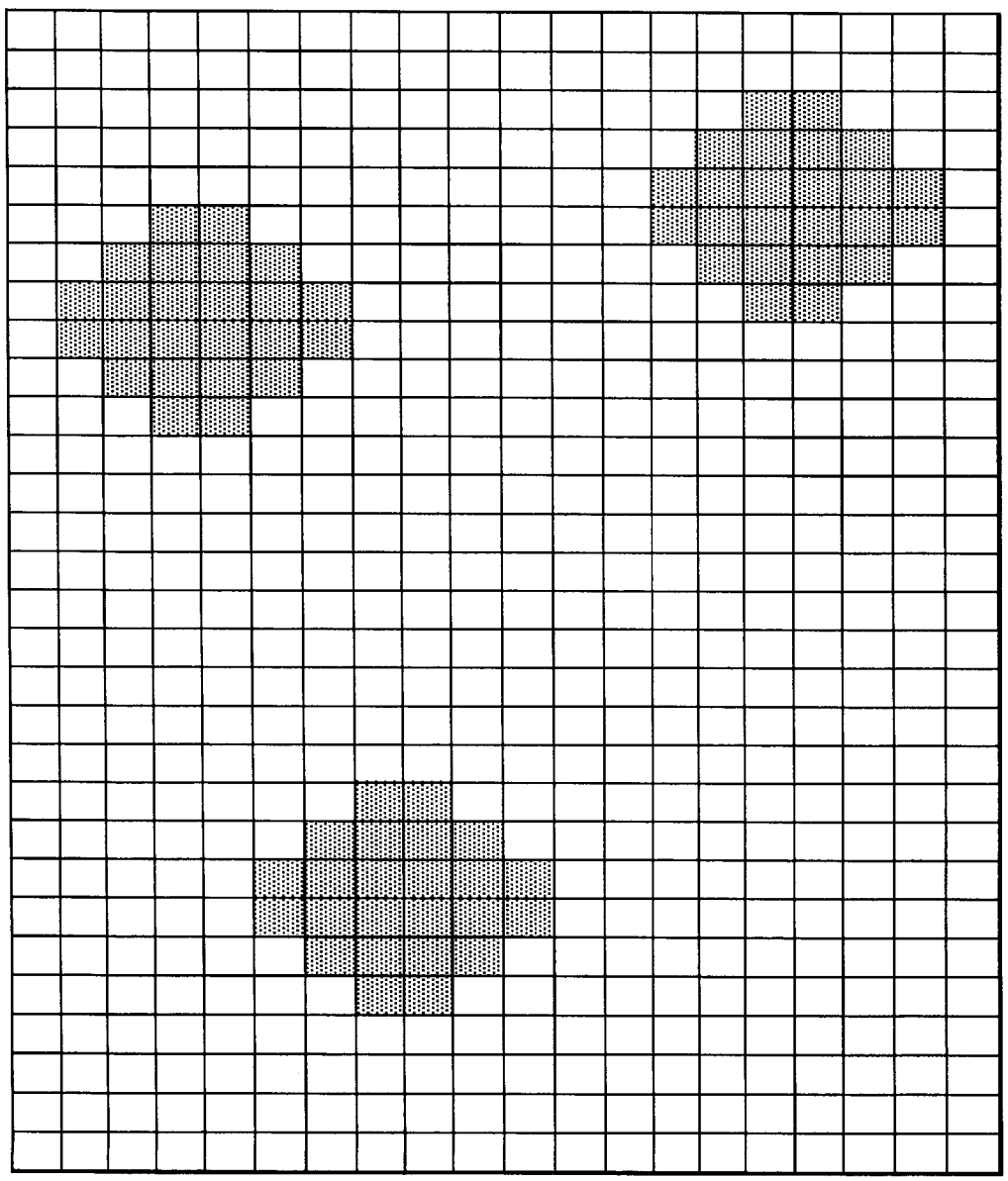
Figures 11A, 11B, 11C:
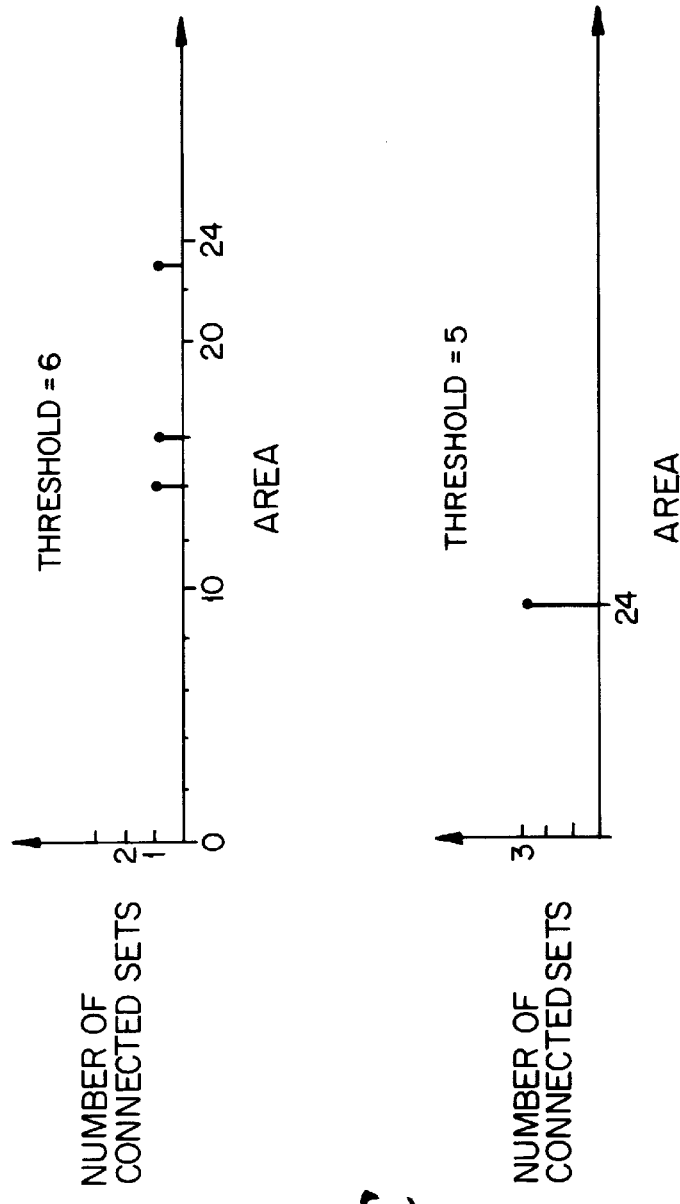
FIGS. 11A–11C are diagrams of histograms derived from the digital image data of FIGS. 7–10.
Figure 12:
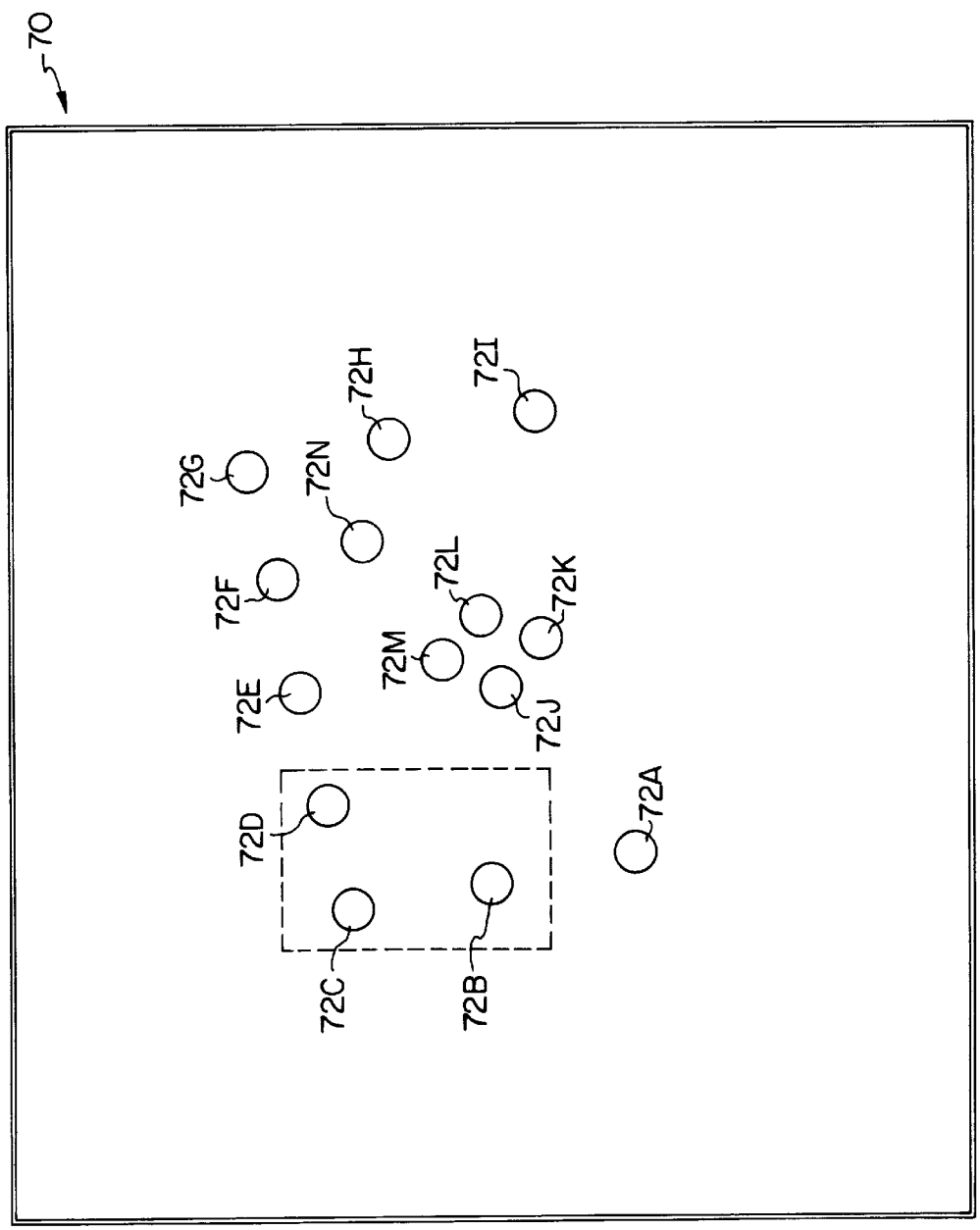
FIG. 12 is a diagram of background/foreground digital data derived from the digital image data of FIGS. 7–10.
Figure 13:
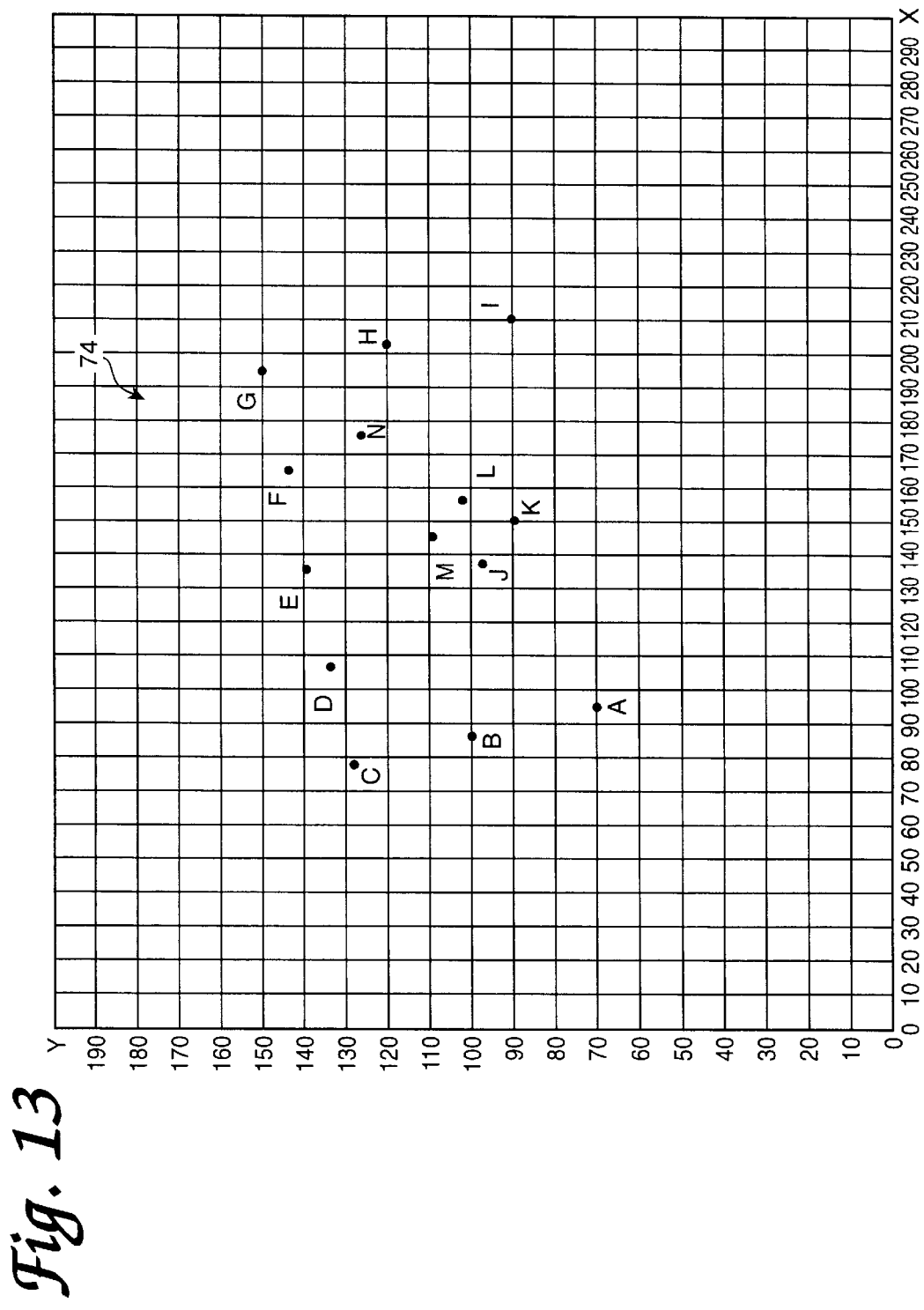
FIG. 13 is a diagram of an arrangement of points derived from the background/foreground digital data of FIG. 12.

In the digital image 36, for each threshold value in a set of possible threshold values (e.g., 5, 6, 7), the threshold determiner 40 determines the area of each set of connected (i.e., contiguous) image elements that have values equal to or greater than the threshold value (step 2010). For each threshold value, the sets are grouped by area (step 2020). For example, in the case of portion 68 (FIG. 8) which includes image elements having values 2, 5, 6, 7, and 8, if a threshold value of 7 is used, it is determined that portion 68 has two sets having an area of 2, and one set having an area of 12, as shown in an area histogram in FIG. 11A. The sets determined for threshold values 6 and 5 for portion 68 are shown in FIGS. 9 and 10, respectively, and in area histograms in FIGS. 11B and 11C, respectively.

The threshold determiner 40 determines the threshold value (i.e., 5 in the case of portion 68) for which the digital image 36 has the highest number of sets of similar area (step 2030).

The threshold applier 34 applies the threshold value to the digital image 36 to produce the background/foreground digital image 32 (e.g., image 70 of FIG. 12), which includes discrete objects (e.g., objects 72A–72N) in the foreground (step 2040). For each image element in the digital image 36, the background/foreground digital image 32 has a corresponding image element that has one of two values: a value associated with the background or a value associated with the foreground (e.g., 0 or 9, respectively).

The points producer 30 produces arrangement of points 26 (e.g., arrangement 74 of FIG. 13) in which each point represents a location of a corresponding discrete object of the background/foreground digital image (e.g., points A–N shown in FIG. 13 and listed in FIG. 14 that correspond to discrete objects 72A–72N, respectively) (step 2050). Each point is selected by determining an image element that represents a centroid of the corresponding discrete object. Alternatively, each point may be selected by determining the center of the smallest rectangle or circle that encloses the corresponding discrete object. The arrangement may exclude points corresponding to any discrete objects that fail to meet size or shape requirements.

The vectors producer 42 produces set of vectors 44 (e.g., a master table of vectors) by determining vectors from each point to a number (e.g., four) of the point's nearest neighboring points (step 2060). For example, the vectors shown in FIGS. 15 and 17 and listed in FIGS. 14 and 16 are produced for arrangement 74 of FIG. 13. For point A, the nearest four points are points B, J, K, and M, corresponding to vectors AB, AJ, AK, and AM, respectively.

Figure 15:
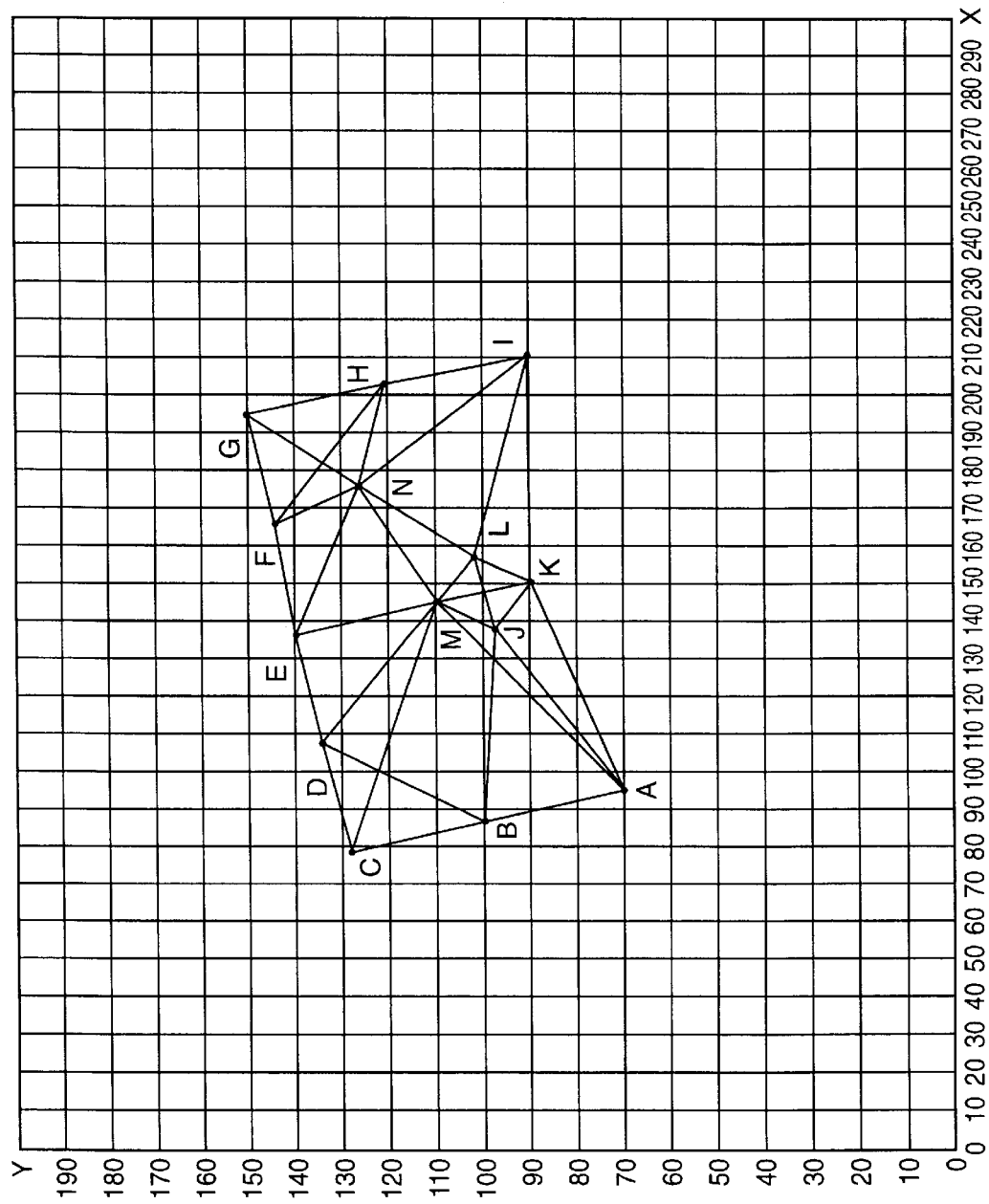
FIG. 15 is a diagram of vectors derived from the arrangement of FIG. 13.
Figure 15A:
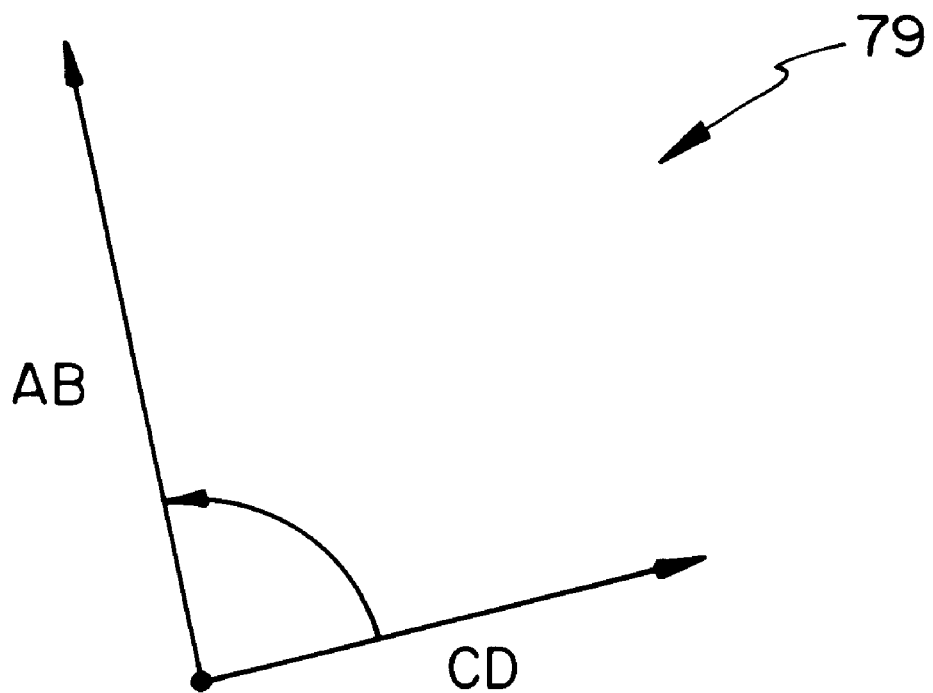
FIG. 15A is a diagram of a grid element derived from the vectors of FIG. 15.
Figure 17:
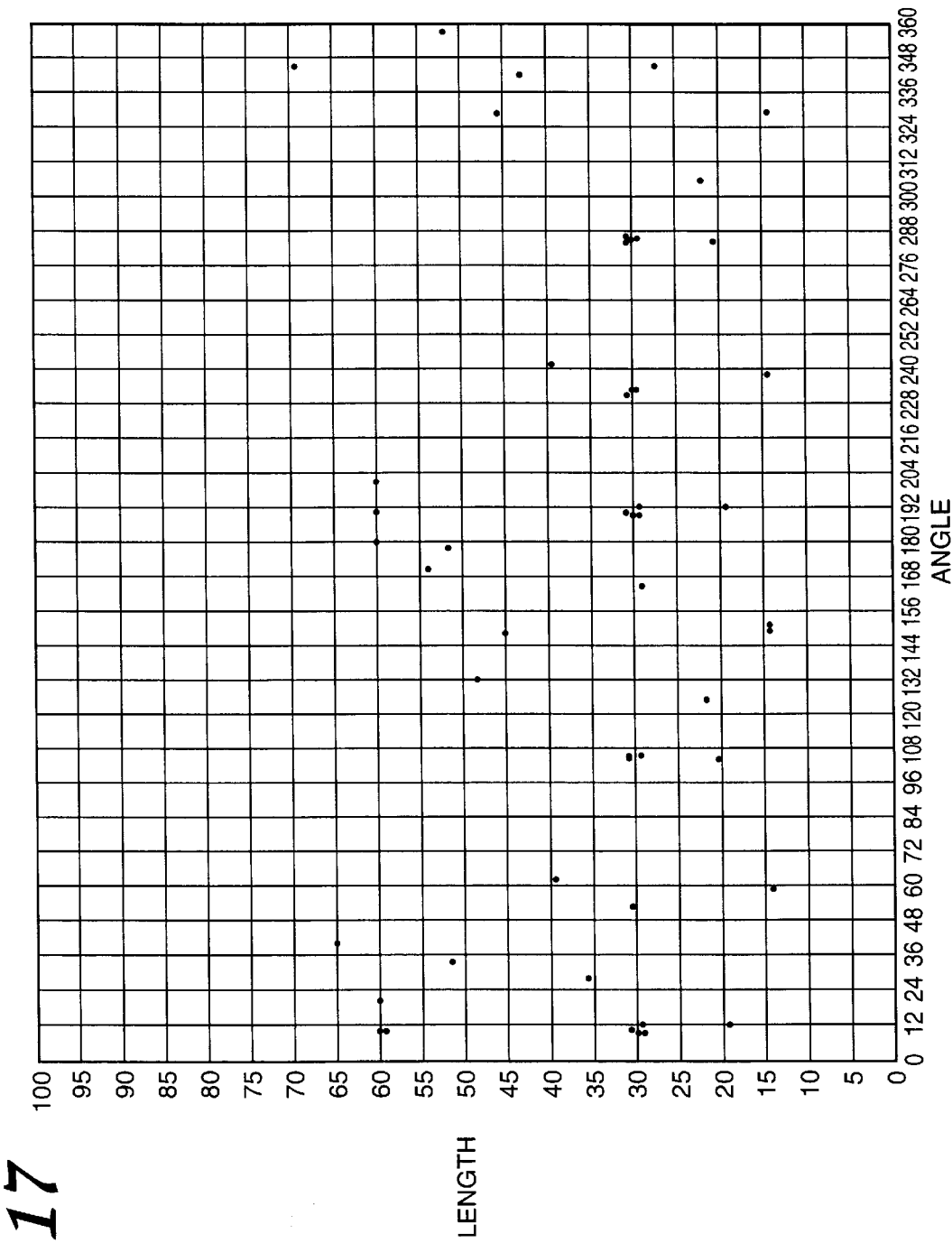
FIG. 17 is a histogram derived from the vectors of FIG. 15.
Figure 18:
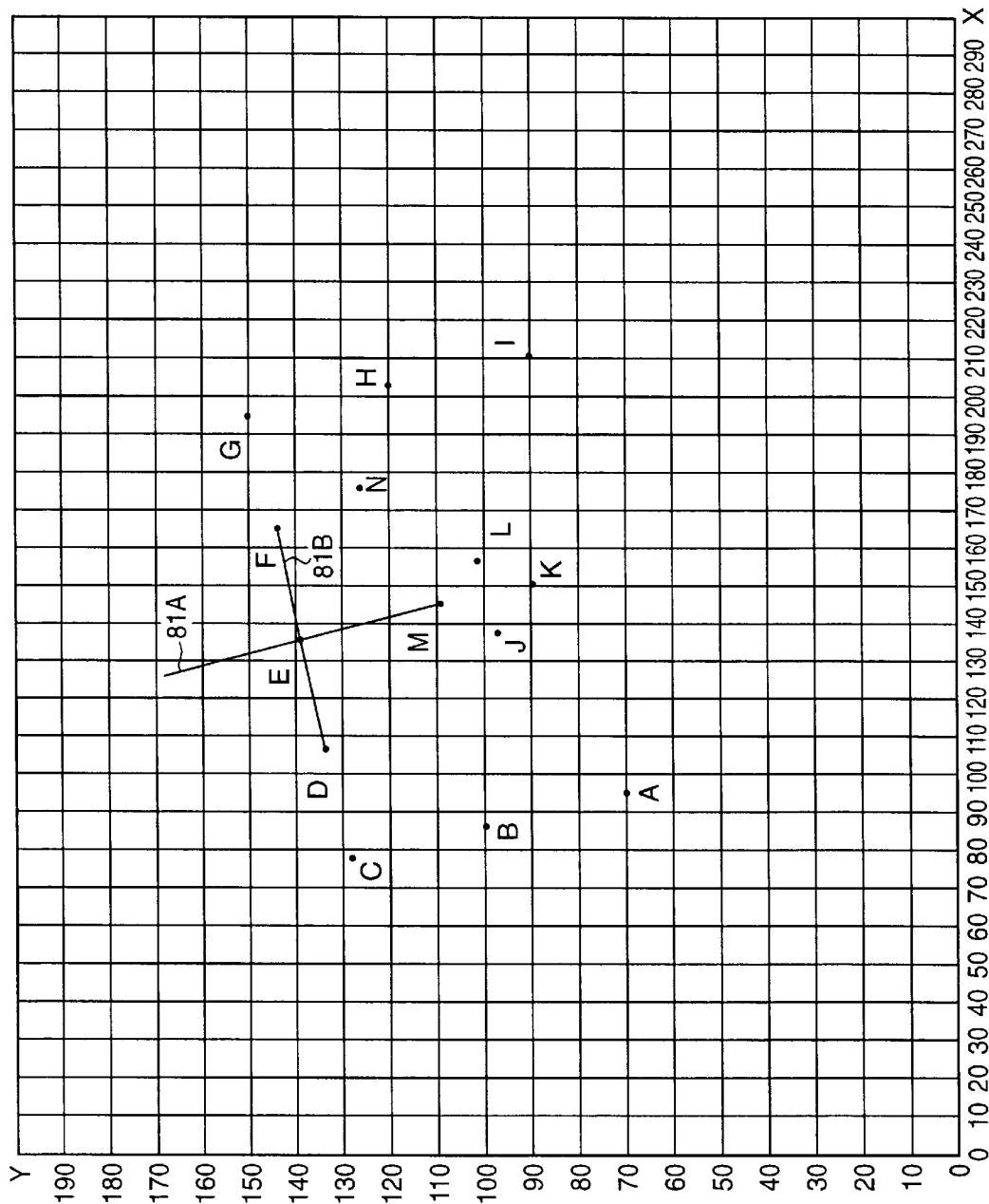
FIGS. 18–19, 21, 24–25 are diagrams of grids derived from the arrangement of FIG. 13.

For the purposes of the grid element producer 46, vectors that fall within angle and length tolerances of each other are considered instances of the same vector. For each possible pair of vectors in the set 44, the grid element producer 46 produces a grid element (step 2070). For each grid element (step 2080), a best-matching point is determined in the arrangement of points 26 (step 2090). The best-matching point is the point having the highest number of associated neighboring points that match positions defined by the grid element. For example, in the case of a grid element 79 (FIG. 15A) having vectors components based on vectors AB and CD ("vector pair AB/CD") of FIG. 15, the best-matching point in arrangement 74 is point E as shown in FIG. 18. This is so because when a different grid is started at each point using grid element 79 (e.g., for point E, a starting grid shown by line segments 81A and 81B that are twice the lengths of vectors AB and CD, respectively, and that cross at point E), point E is found to have the highest number of associated neighboring points (namely, three: points D, M, and F) that match positions defined by grid element 79. With respect to the other points, the corresponding number is only two for each of points B-D and F-H, and only one or zero for each of the remaining points.

Figure 19:
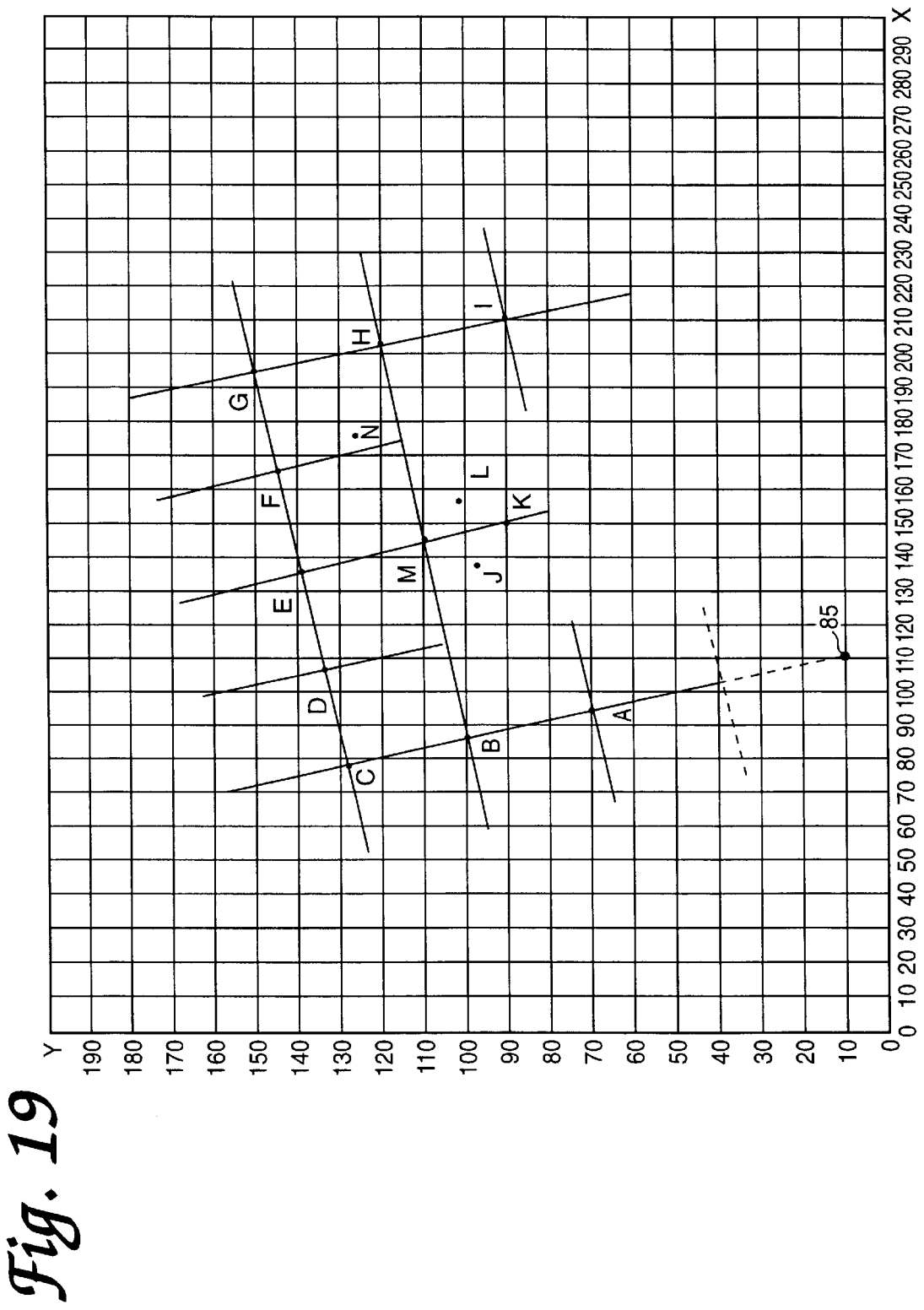
Figure 20:
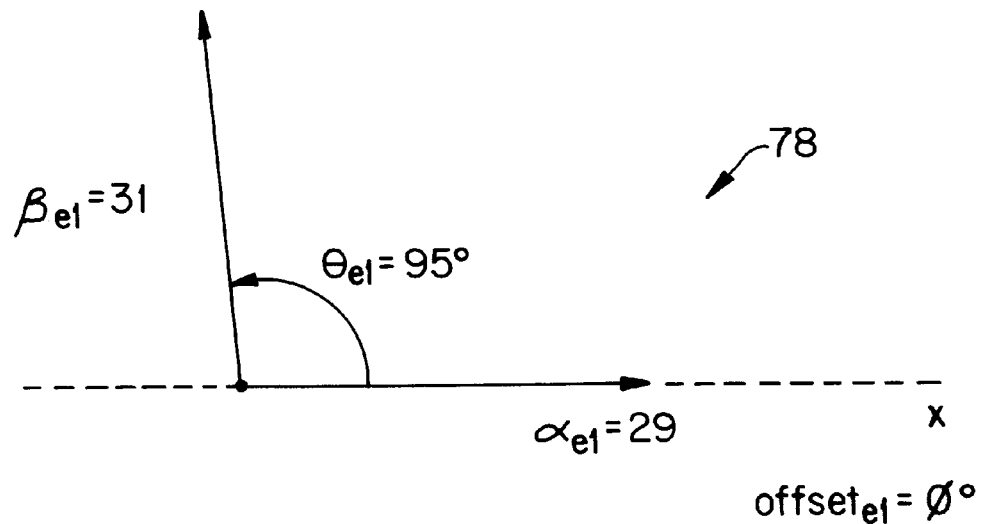
FIGS. 20, 23 are diagrams of refined grid elements derived from the arrangement of FIG. 13.
Figure 23:
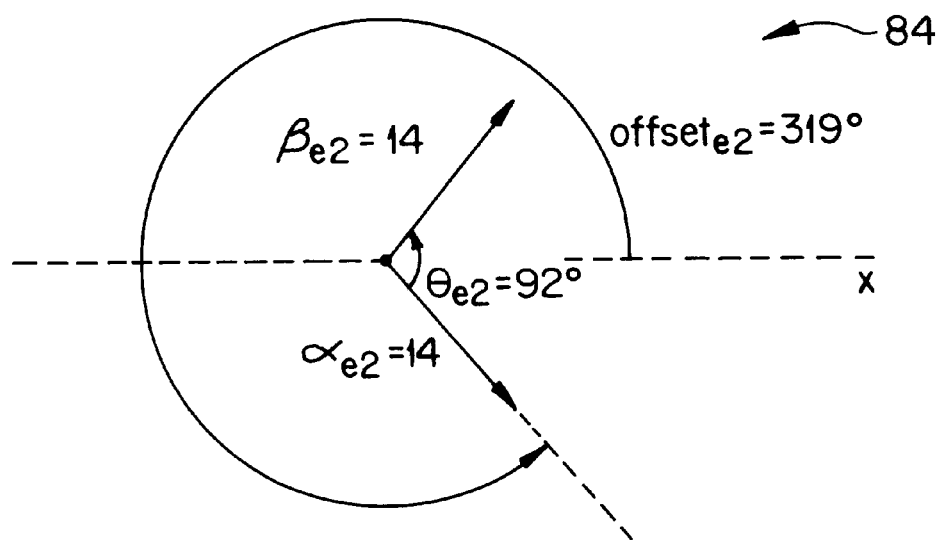
Figure 21:
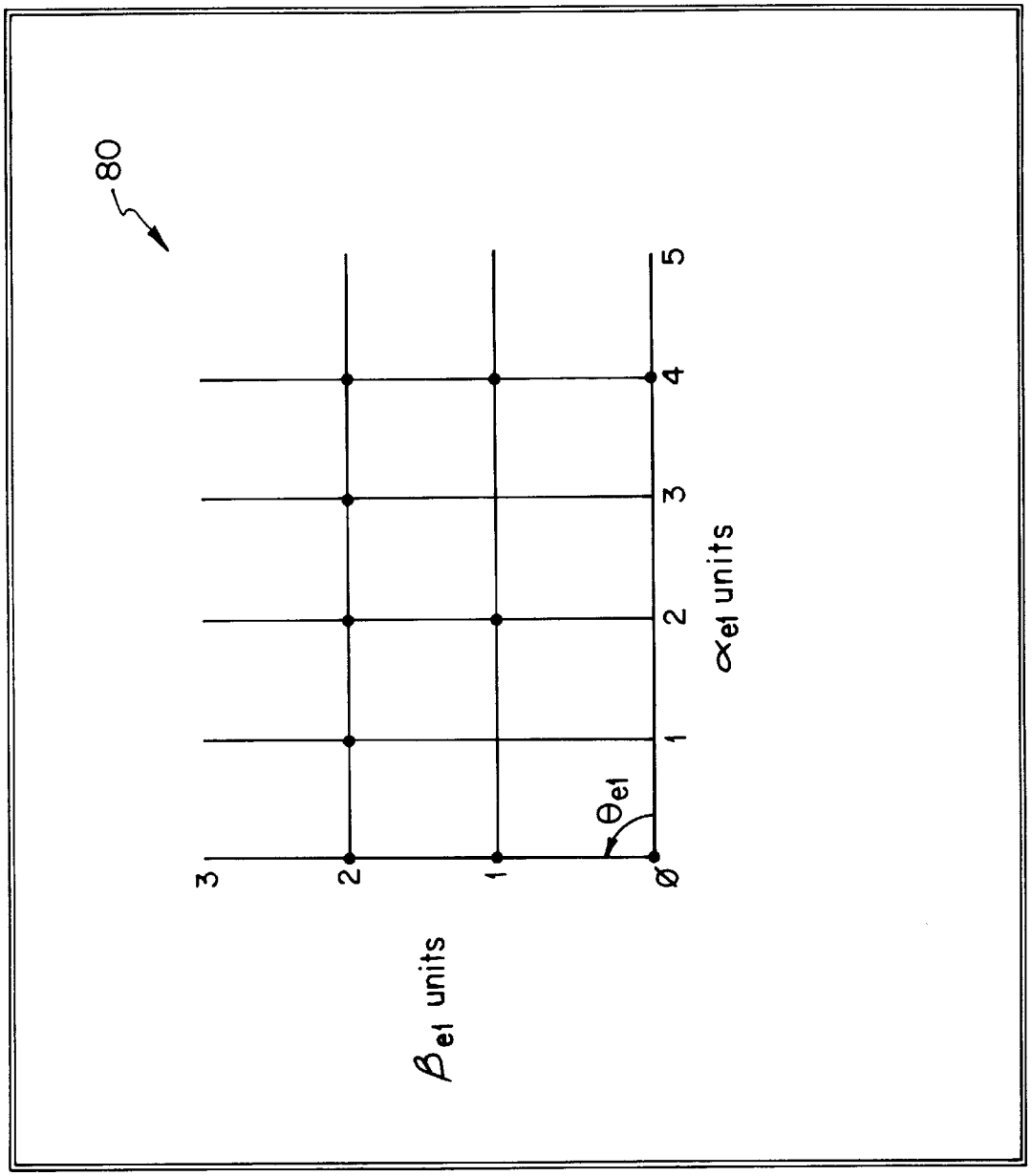
Figure 24:
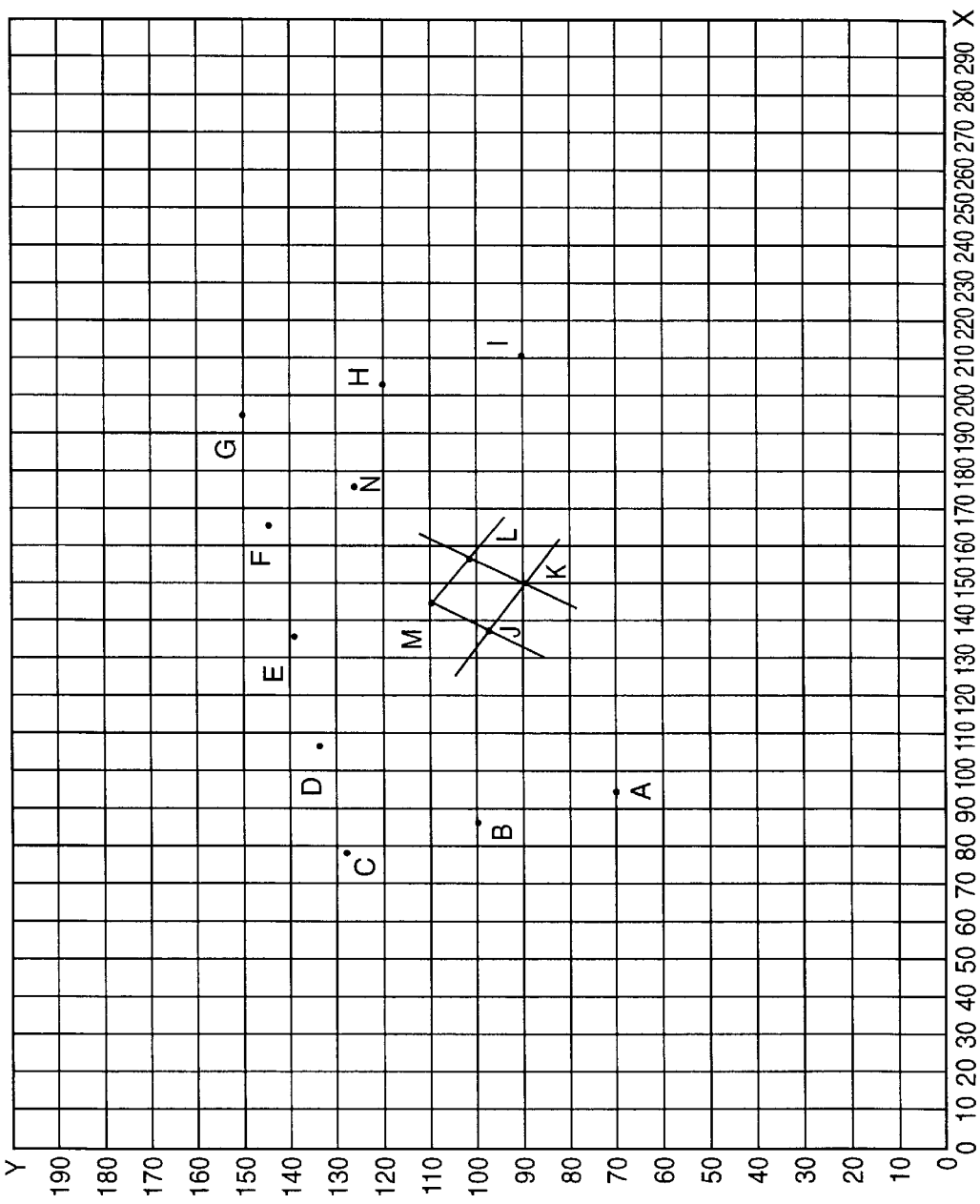
Figure 25:
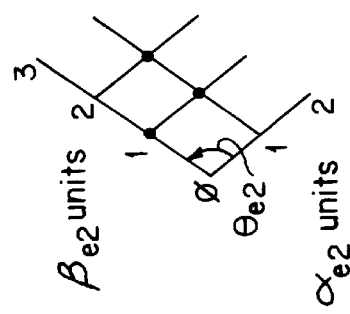

For each grid element, the grid producer and element refiner 50 uses the best-matching point as an origin for producing a corresponding grid (step 2100). As shown in FIG. 19 for the grid element based on vector pair AB/CD, the corresponding grid is produced by finding neighboring points that match positions defined by the grid element. A neighboring point so matches if the actual location of the neighboring point is within a distance tolerance (e.g., half the expected width of each discrete object) of the defined location.

As matching neighboring points are found, the grid element is refined to take into account differences between defined (i.e., expected) locations and the actual locations of the points found. The refinement may be based on any statistical combination of the differences, e.g., a linear combination such as an effective average of the differences, or a non-linear combination such as an effective root-mean-square combination of the differences.

For example, in the case of the initial grid element based on vector pair AB/CD using point E as an origin, an (x,y) location of (164,145) is defined for a neighboring point. In this case, since point F matches the defined location but has an actual (x,y) location of (165,144) (i.e., slightly below and to the right of the defined location), the grid element is altered so that the CD-based vector component of the grid element is shifted accordingly, i.e., to point slightly below and to the right of its original bearing. The difference between the defined and actual locations for point F may be represented as (164−165,145−144) or (−1,1).

As the corresponding grid is produced, the refined grid element is then used at each matching neighboring point found to find additional matching points, and is further refined as the additional matching points are found. How the refined grid element is further altered each time a difference is found depends on the nature of the combination used in the refinement, and perhaps (e.g., where an effective average serves as the combination) also on how many matching neighboring points were found previously in the refinement process. In general where the effective average is used, for an nth matching point associated with a vector component and a difference of (A,B), the orientation of the vector component is altered by the difference divided by (n+1), i.e., (A/(n+1),B/(n+1)). For instance, if a (5,5) difference is determined for a fourth matching point associated with a vector component, the orientation of the component is altered by (1,1), i.e., a fifth of the (5,5) difference. Thus, in the case of point F described above, if point F is the first matching point associated with the CD-based vector component (i.e., n=1 and n+1=2), the orientation of the CD-based vector component is altered by a difference of (−1/2,1/2), i.e., (−0.5,0.5). Dividing the difference by (n+1) allows each matching point to affect the vector component equally.

The refinement process may make use of a pseudo-inverse transform that represents the grid element and is altered as each matching point is found. Each matching point may or may not affect the grid element or vector component equally. In some applications, it may be advantageous to avoid accepting as matching an outlying matching point, i.e., a point that technically lines up with the grid element but is not an immediately neighboring point of any matching point already found. For example, if a point were located where indicated by reference numeral 85 in FIG. 19, the point would be an outlying matching point because it would line up with the grid as shown but would not be an immediately neighboring point of any matching point.

If a minimum number of matching points are not found as the corresponding grid is produced, the refined grid element and grid are rejected (step 2110).

From the set of refined grid elements so developed, the grid producer and element refiner 50 retains the refined grid element and corresponding grid (e.g., for arrangement 74, element 78 and grid 80 shown in FIGS. 20 and 21, respectively) having the highest number of associated matching points (step 2120). This first refined grid element and corresponding grid are retained in normalized form, i.e., a form that incorporates a rotational adjustment of the refined grid element and corresponding grid if necessary so that the a vector component is parallel to the x-axis.

The grid producer and element refiner 50 also records the locations of the matching points in an on-off table (e.g., for arrangement 74, table 82 shown in FIG. 22) corresponding to the refined grid element (step 2130). Thus, a refined version of the matching points portion of the arrangement can be created using only the refined grid element and the on-off table.

In iterations, ignoring the points already recorded in connection with any grid elements retained after previous iterations (e.g., by masking out such points), the grid producer and element refiner 50 produces additional retained grid elements and on-off tables for which the minimum number of matching points are found (e.g., as shown in FIGS. 23–26 for additional element 84 and table 86) (step 2140). As produced, the additional retained grid elements incorporate the same rotational adjustment (if any) that was necessary to retain the first retained grid element in normalized form as described above.

The positions of any remaining points in the arrangement (e.g., point N which was matched for neither element 78 nor element 84) are recorded, after the same rotational adjustment based on the first retained grid element (step 2150).

Thus, the image processing system 24 detects regular patterns represented in the digital image 36 and indicates the patterns by producing the grid elements and corresponding on-off tables.

The technique (i.e., the procedure described above) may be implemented in hardware or software, or a combination of both. In at least some cases, it is advantageous if the technique is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In at least some cases, it is advantageous if each program is implemented in a high level procedural or object-oriented programming language such as Microsoft C or C++ to communicate with a computer system. The programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the threshold determiner 40 may be based on circularity or bounding-box perimeters to expose discrete items of similar circularity or similar bounding-box perimeters. The arrangement analyzer 10 may refine the grid element by applying a formula that takes as inputs the points and the grid element's original vectors and angles. For example, the formula may specify determining for each point a difference between its expected and actual location, producing an average of the differences, and adjusting the grid element by the average. In cases where the arrangement includes more than one ideal pattern and each pattern is identified with a different size of discrete objects, the image processing system may check the size of a discrete object (e.g., by using a normalized correlation search) before associating the corresponding point with a particular pattern.

What is claimed is:

1. A method for analyzing an acquired arrangement of object locations that imperfectly conforms to an ideal arrangement of points, the method comprising:
   in the acquired arrangement of object locations, finding sets of vectors;
   deriving a composite set of vectors from the sets of vectors;
   determining vectors between an object location and a number of the object locations, nearest neighboring points;
   determining whether an object location matches, to an acceptable tolerance, a position specified by the composite set of vectors; and
   adjusting at least one of the vectors in the composite set to take into account a difference between the position specified and the actual position of the matching object location.

2. The method of claim 1, wherein at least one of the object locations represents an electrical terminal.

3. The method of claim 2, further comprising:
   deriving an approximation of the ideal arrangement of points from the acquired arrangement of object locations, wherein the approximation includes an indication of whether an intersection specified by the composite set of vectors corresponds to an object location.

4. The method of claim 1, further comprising:
   based on the adjusted composite set of vectors and the actual position of the matching object location, specifying a location in which to search for another matching object location.

5. The method of claim 1, further comprising:
   determining whether a non-matching object location matches, to an acceptable tolerance, another position specified by another composite set of the vectors.

6. Computer software, residing on a computer-readable storage medium, comprising instructions for use in a computer system to analyze an acquired arrangement of object locations that imperfectly conforms to an ideal arrangement of points, the instructions causing the system to:
   in the acquired arrangement of objects locations, find sets of vectors;
   derive a composite set of vectors from the sets of vectors;
   determine vectors between an object location and a number of the object location's nearest neighboring points;
   determine whether an object location matches, to an acceptable tolerance, a position specified by the composite set of vectors; and
   adjust at least one of the vectors in the composite set to take into account a difference between the position specified and the actual position of the matching object location.

7. The computer software of claim 6, wherein at least one of the object locations represents an electrical terminal.

8. The computer software of claim 7, further comprising instructions for causing the system to:
   derive an approximation of the ideal arrangement of points from the acquired arrangement of object locations, wherein the approximation includes an indication of whether an intersection specified by the composite set of vectors corresponds to an object location.

9. A method for analyzing an acquired arrangement of object locations, at least one of the object locations representing an electrical terminal, the arrangement imperfectly conforming to an ideal arrangement of points, the method comprising:
   in the acquired arrangement of object locations, finding sets of vectors by determining vectors between each object location and a number of the object location's nearest neighboring points;
   deriving a composite set of vectors from the sets of vectors;
   determining whether an object location matches, to an acceptable tolerance, a position specified by the composite set of vectors;
   adjusting at least one of the vectors in the composite set to take into account a difference between the position specified and the actual position of the matching object location; and
   deriving an approximation of the ideal arrangement of points from the acquired arrangement of object locations, wherein the approximation includes an indication of whether an intersection specified by the composite set of vectors corresponds to an object location.

10. A system for detecting a pattern of discrete objects represented in an image, the system comprising:
    a location producer deriving an arrangement of object locations from the image, each object location representing an electrical terminal;

a vectors producer deriving a set of vectors represented in the arrangement;

a grid element producer deriving a two-vector grid element from the set of vectors; and a grid producer and grid element refiner testing the two-vector grid element against the arrangement of object locations and refining the two-vector grid element to take into account the actual positions of the object locations.

11. Computer software, residing on a computer-readable storage medium, comprising instructions for use in a computer system to analyze an acquired arrangement of object locations, at least one of the object locations representing an electrical terminal, the arrangement imperfectly conforming to an ideal arrangement of points, the instructions causing the system to:

in the acquired arrangement of object locations, find sets of vectors by determining vectors between each object location and a number of the object location's nearest neighboring points;

derive a composite set of vectors from the sets of vectors;

determine whether an object location matches, to an acceptable tolerance, a position specified by the composite set of vectors;

adjust at least one of the vectors in the composite set to take into account a difference between the position specified and the actual position of the matching object location; and derive an approximation of the ideal arrangement of points from the acquired arrangement of object locations, wherein the approximation includes an indication of whether an intersection specified by the composite set of vectors corresponds to an object location.

12. A method for analyzing a given arrangement of objects, within a two-dimensional digital representation of a device comprising the objects, by comparing the given arrangement to an ideal arrangement, the method comprising:

representing relationships among the objects in the two-dimensional representation with vectors connecting the objects to each other, each of the vectors comprising direction information and distance information;

obtaining a given subset of the vectors, the given subset representing a given object in relation to given neighboring objects near the given object;

obtaining a corresponding given ideal subset of vectors from the ideal arrangement and comparing the given subset to the given ideal subset to determine whether the given subset matches the given ideal subset to within an acceptable tolerance; and creating modified position information regarding the given object in accordance with a relation between a location of a corresponding object in the ideal arrangement and the given object.

13. The method according to claim 12, further comprising:

producing an arrangement of points, each of the points representing a location of a corresponding one of the objects; and determining a best matching point among the arrangement of points.

\* \* \* \* \*